Nov. 24, 1936.  W. R. SIMONTON  2,061,679
MACHINE FOR DECORATING FLAT SURFACES
Filed June 22, 1935  2 Sheets-Sheet 1
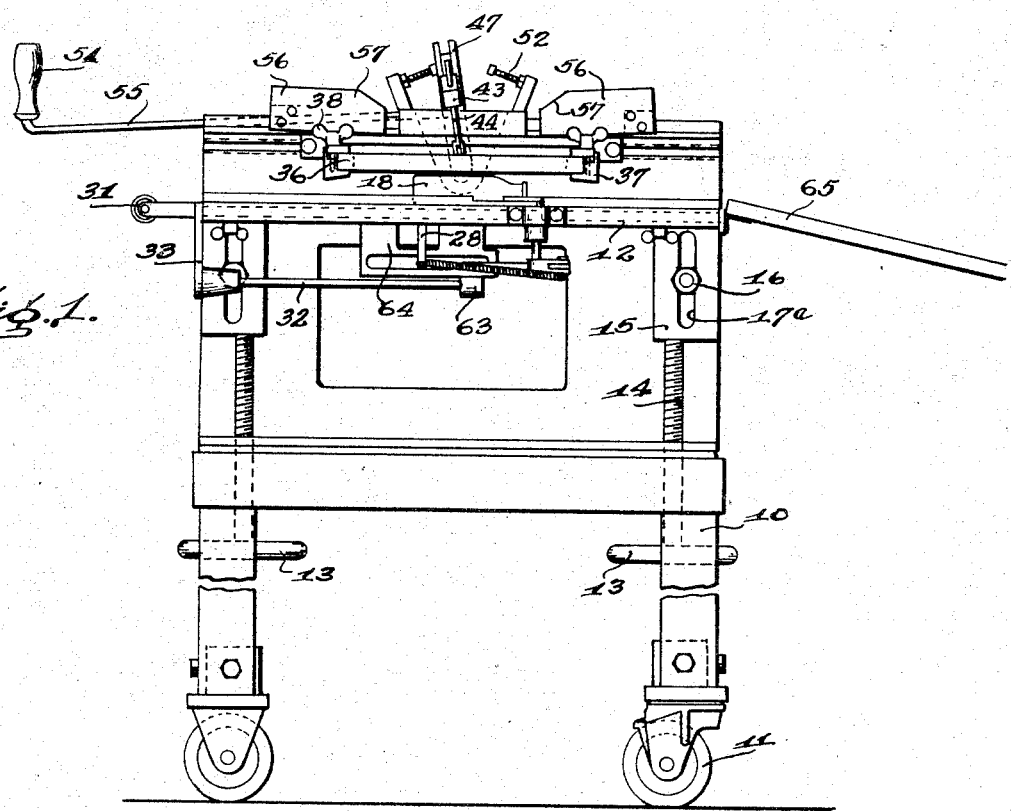
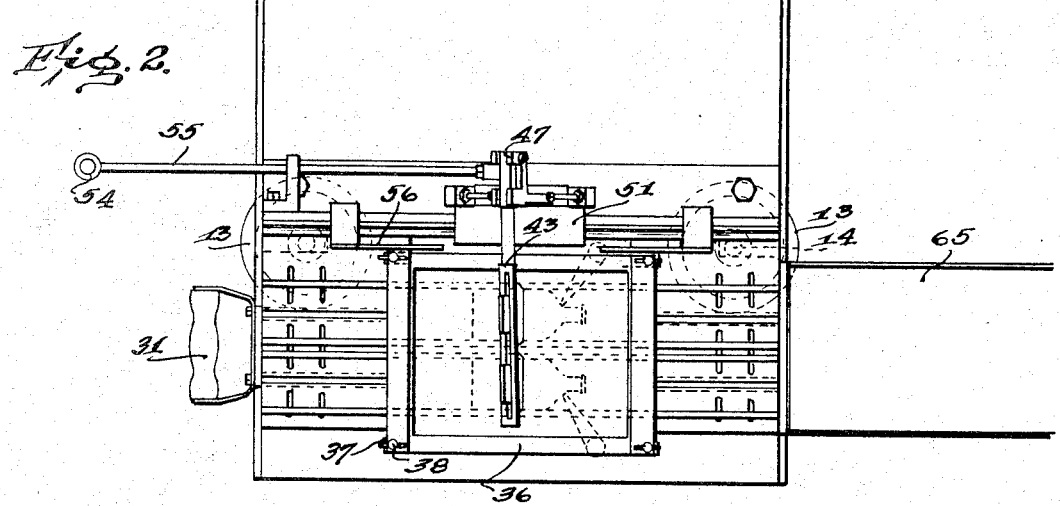
Warren R. Simonton
INVENTOR.
BY J. F. Rule
ATTORNEY Nov. 24, 1936.                    W. R. SIMONTON                    2,061,679
                        MACHINE FOR DECORATING FLAT SURFACES
                        Filed June 22, 1935            2 Sheets-Sheet 2

Warren R. Simonton
INVENTOR.

BY  J. F. Rule,
ATTORNEY

Patented Nov. 24, 1936

2,061,679

UNITED STATES PATENT OFFICE 2,061,679

MACHINE FOR DECORATING FLAT SURFACES

Warren R. Simonton, Huntington, W. Va., assignor to Owens-Illinois Glass Company, a corporation of Ohio Application June 22, 1935, Serial No. 27,882

2 Claims. (Cl. 101—123)

My invention relates to apparatus for printing, decorating or marking surfaces by a stencil or screen method. In its preferred form as herein shown, the invention comprises a machine for decorating the surfaces of bottles or other articles by a method in which an ink, paint or other coloring or marking material is applied to the surface of the article by means of a squeegee which operates to force the decorating material through a silk screen or the like onto the surface to be decorated. The screen may be provided as usual with an imperforate coat or covering of sheet material from which has been removed portions defining the design with which the article is to be decorated.

An object of the invention is to provide a simple and practical form of machine or apparatus for decorating the articles, including means for guiding the articles into and away from the decorating zone, stop devices for arresting and holding the articles while being decorated, and means for operating the squeegee in a manner to decorate the articles in quick succession. The invention includes means for decorating a plurality of articles simultaneously, and means for readily adjusting the apparatus to articles of different sizes and shapes.

Other objects of the invention will appear hereinafter.

In the accompanying drawings:

Fig. 1 is a side elevation, parts being broken away, showing a machine constructed in accordance with my invention.

Fig. 2 is a top plan view of the same.

Figures 3, 4:
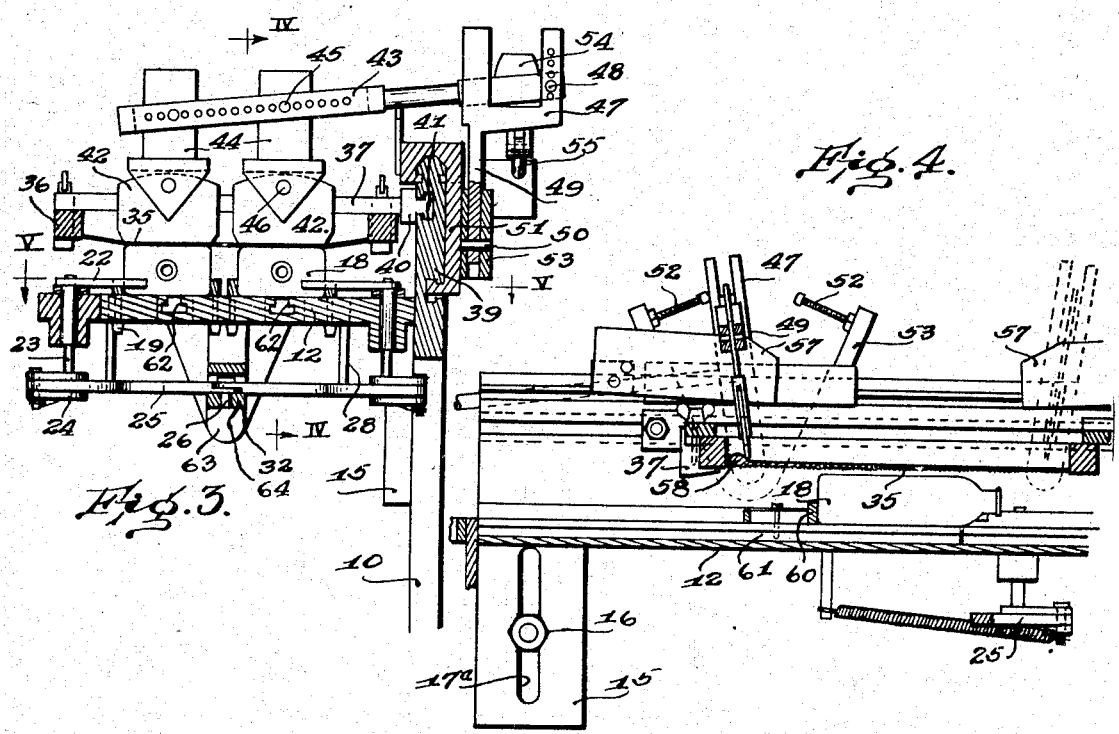
Fig. 3 is a part sectional end elevation.
Fig. 4 is a fragmentary sectional side elevation, the section being taken at the line IV—IV on Fig. 3.

The machine comprises a supporting frame 10 provided with casters 11. A horizontally disposed platform or table 12 is supported on the framework 10 and is adjustable up and down by means of hand wheels 13 on the lower ends of adjusting rods 14 which have a screw threaded connection with the frame 10. The upper ends of the rods 14 engage arms 15 depending from the platform 12. Clamping bolts 16 extend through slots 17ª in the arms 15 and serve to clamp the platform in its adjusted position.

Parallel guide strips 17 mounted on the platform 12 and extending lengthwise thereof, serve as guides for bottles 18 or other articles which are to be decorated. The guides 17 are adjustable laterally to accommodate articles of different widths and are secured in adjusted position by clamping bolts 19 which extend downward through transverse slots 20 in the platform. As shown, two pairs of guides 17 are provided to permit two articles at a time to be moved to and from the decorating zone, although this number may be increased or decreased, if desired.

The articles to be decorated are placed in position between the guides 17 at or near the left-hand end of the platform 12 (Fig. 5) and then moved forward to the decorating zone where they are arrested by a pair of stops 22. These stops consist of rock arms fixed to the upper ends of rock shafts 23 journaled in the platform 12. Secured to the lower ends of the rock shafts are rock arms 24, to the outer ends of which are pivoted links 25. The inner ends of the links 25 are connected by a pivot pin 26. The rock arms 22 when swung outward as shown in dotted lines (Fig. 5) permit the bottles to be fed forward to the decorating zone. This outward movement of the stop arms 22 is effected by springs 27 connected at their outer ends to the rock arms 24 and anchored at their opposite ends to posts 28 depending from the platform 12. Recesses 30 in the outer guide strips 17 provide stop shoulders to limit the inward swinging movement of the stop arms 22.

The bottles 18 while being decorated are held against the stop arms 22 by means of lugs or stops 60 which engage the rear ends of the bottles. The stops 60 are adjustably attached to a pair of horizontal rods 61, the outer ends of which are secured to a vertical plate 33 provided with a handle 31. The stop lugs 60 and rods 61 are guided in a pair of grooves 62 provided in the platform 12. The plate 33 carries a horizontal push rod 32, the forward end of which is adapted to engage a lug 63 on a slide block 64 in which the pivot pin 26 is mounted, thereby swinging the stop arms 22 inward as hereinafter described.

The decorating apparatus comprises a silk screen 35 or other conventional screen stenciled or provided in the usual manner with a pattern of the design which is to be transferred to the articles 18. The screen 35 is removably clamped or secured in a screen frame 36, the latter including clamping bars 37 and clamping screws 38. The screen frame is supported on a frame member or supporting plate 39 which projects upwardly above the platform 12 and extends lengthwise thereof, said supporting plate forming an integral part of the frame 10. The bars 37 are formed with heads 40 which are slidably mounted in a guideway 41 formed in the plate 39, permitting adjustment of the screen in a direction lengthwise of the guides 17.

Squeegees or wipers 42 which may be of conventional construction and which are herein shown as flat pieces of rubber or other soft flexible material, are carried by an arm 43. The connection between said arm and the wipers comprises stems or carriers 44 connected by pivots 45 to said arm and having pivotal connections 46 with the wipers. The arm 43 is connected at one end to a yoke 47 by means of a pivot 48, the yoke being formed at the upper end of an arm 49 pivoted at its lower end on a pivot pin 50 fixed to a slide block 51. The latter is mounted on the stationary frame plate 39 for horizontal reciprocating movement lengthwise thereof.

The rock arm 49 has a limited rocking movement about its pivot determined by stop screws 52 adjustably supported in a frame 53 fixed to the slide 51. The slide 51 and rock arm 49 carrying the squeegees, are actuated by a handle 54 at the outer end of a rod 55, the inner end of which is connected to the arm 49. Cam plates 56 formed with cam surfaces 57 serve to lift the arm 43 at the end of each operating stroke for lifting the squeegees over the decorating material 58 (Fig. 4) which piles up in front of the squeegees during the operating stroke. The decorating material may consist of ink, pigments, paint or the like.

The operation is as follows: Assuming the parts to be in the position shown in full lines (Figs. 4 and 5), with the squeegees at the limit of their movement to the left, a pair of bottles 18 being in position directly beneath the screen, the operator now pushes the handle 54 forward. The initial movement rocks the arm 49 about its pivot 50 until arrested by the stop 52. This reverses the inclination of the squeegees and carries the lower edges thereof to the left, past the pigment or inking material 58 which has been piled up in advance of the squeegee during its preceding stroke. At the same time the arm 43 is moved off the cam surface 57, allowing the squeegees to move downward into engagement with the screen. The continued forward movement of the handle 54 moves the carrier 51 forward and with it the squeegees or wipers 42. The latter wiping across the screen 35, force the ink or pigment 58 through the screen pattern in a well known manner, applying the design to the articles 18. As the squeegees approach the limit of their movement to the right, the arm 43 engages the opposite cam surface 57, thereby lifting the squeegees off the screen.

Figure 5:
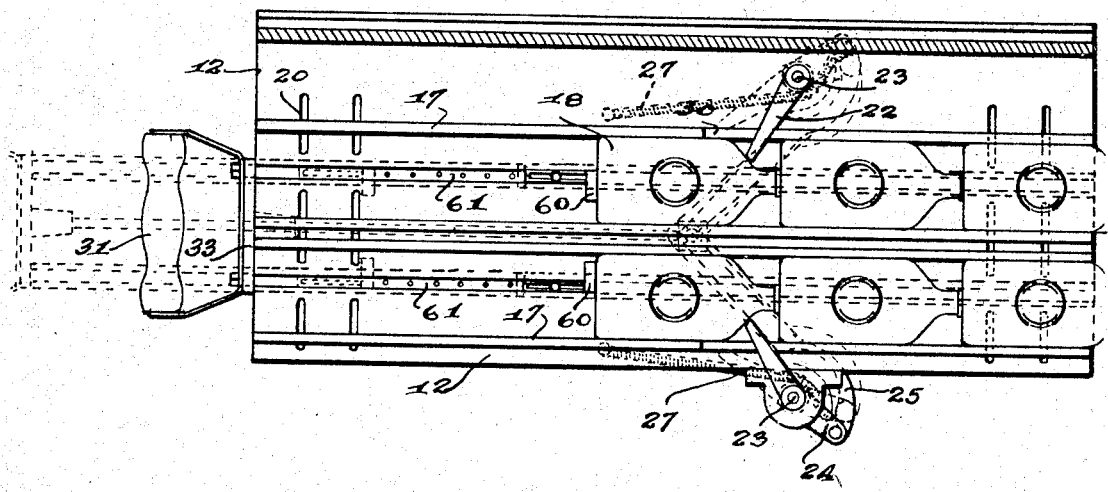
Fig. 5 is a sectional plan at the plane of the line V—V on Fig. 3.

The operator now pulls the handle 31 outward to the dotted line position (Fig. 5), thereby withdrawing the stop lugs 60 and permitting the stop arms 22 to be swung outward to the dotted line position (Fig. 5). A pair of bottles can now be placed in the guideways directly behind the pair which have just been decorated. The handle 31 is then moved forward so that the bottles which have just been placed on the platform are pushed forward into the decorating zone and the bottles which have just been decorated are advanced beyond the decorating zone. The decorated bottles are thus fed forward step by step and pass from the platform 12 onto an inclined support 65.

As the handle 31 approaches the limit of its forward movement in feeding a pair of bottles to the decorating zone, the rod 32 engages a lug 63 and moves the arms 25 forward, thereby swinging the stop arms 22 inward into position to engage the shoulders of the bottles as the latter are brought to position to be decorated. The bottles are thus securely held between the stop arms 22 and the lugs 60. As above described, the forward movement of the handle 54 operates the squeegee for decorating a pair of articles. The next succeeding pair is decorated by pulling the handle 54 to the left. During this return stroke, the pair of articles beneath the screen are decorated in the same manner as the preceding pair were decorated during the forward stroke.

Modifications may be resorted to within the spirit and scope of my invention.

I claim:

1. Apparatus for decorating articles, comprising a supporting platform, parallel guides extending along the platform and providing guideways arranged side by side to receive articles to be decorated and guide said articles into and beyond a decorating zone, stop mechanism for arresting a pair of articles within the decorating zone, said stop mechanism comprising rock shafts, rock arms secured thereto and projecting within said guideways in position to arrest the articles and hold them in the decorating zone, a manually operable article pusher, a rod carried by the pusher to hold the rock arms in the said position, springs for withdrawing the rock arms, and means for decorating the articles.

2. Apparatus for decorating articles, comprising a supporting platform, parallel guides extending along the platform and providing guideways arranged side by side to receive articles to be decorated and guide said articles into and beyond a decorating zone, stop mechanism for arresting a pair of articles within the decorating zone, said stop mechanism comprising rock shafts, rock arms secured thereto and projecting within said guideways in position to arrest the articles and hold them in the decorating zone, a manually operable article pusher, a rod carried by the pusher to hold the rock arms in position to force a pair of articles against the pusher, springs for withdrawing the rock arms, and means for decorating the articles, said decorating means comprising a carrier supported above the platform and at one side of the said guides, an arm supported on said carrier and extending laterally over the platform, squeegees carried by said arm, a screen having a stationary mounting in position to overlie the articles within the decorating zone, and means for reciprocating said carrier and causing said squeegees to traverse the screen.

WARREN R. SIMONTON.